United States Patent [19]

Shu

[11] Patent Number: 5,104,933

[45] Date of Patent: Apr. 14, 1992

[54] PREPARATION OF COPOLYMERS OF POLYVINYL ALCOHOLS

[75] Inventor: Paul Shu, Princeton Junction, N.J.

[73] Assignee: Mobil Oil Corp., Fairfax, Va.

[21] Appl. No.: 498,520

[22] Filed: Mar. 26, 1990

Related U.S. Application Data

[63] Continuation-in-part of Ser. No. 307,143, Feb. 6, 1989, abandoned.

[51] Int. Cl.$^5$ .......................... C08F 8/00; C08F 26/04
[52] U.S. Cl. .......................................... 525/59; 525/56
[58] Field of Search .......................................... 525/59

[56] References Cited

U.S. PATENT DOCUMENTS 3,505,303  4/1970  Lindensann .................. 260/91.3
4,775,716  10/1988  Beresniewicz et al. ........... 525/61

Primary Examiner—Joseph L. Schofer
Assistant Examiner—J. M. Reddick
Attorney, Agent, or Firm—Alexander J. McKillop; Charles J. Speciale; Howard M. Flournoy

[57] ABSTRACT

High molecular weight polyvinyl alcohols can be modified with amino compounds such as acrylamide in a one-step low temperature reaction to produce products having higher viscosity than those prepared in costly two-step high temperature modification reactions.

13 Claims, No Drawings

PREPARATION OF COPOLYMERS OF POLYVINYL ALCOHOLS

CROSS-REFERENCE TO RELATED APPLICATIONS

This application is a continuation-in-part of Ser. No. 307,143, filed Feb. 6, 1989,.which is now pending, entitled, PREPARATION OF COPOLYMERS OF POLYVINYL ALCOHOLS.

BACKGROUND OF THE INVENTION

This invention is directed to a simplified method of preparing improved copolymers of polyvinyl alcohols (PVA). More specifically, it is directed to the modification of PVA with various alpha, beta-unsaturated carbonyl compounds.

It is known that PVA may be modified, e.g., by chemical means such as grafting and hydrolysis. Modification of PVA with acrylamide was first reported by H. Ito, et al. Lindemann has obtained a patent on "Water Soluble Modified PVA Films" (U.S. Pat. No. 3,505,303). In this prior art, PVA is first dispersed in water at low temperatures followed by high temperature dissolution to obtain a PVA solution. Thereafter which the modifying agent is added to start the reaction. The above process is useful for PVA soluble in water below 100° C., molecular weight less than $1 \times 10^5$ and degree of hydrolysis less than 90%.

The PVAs utilized herein are not, without the instant modification, soluble in water at ambient temperatures. As PVA molecular weight and degree of hydrolysis increase, its dissolution temperature requirement becomes greater than 100° C. For example, PVA having a MW of $3.5 \times 10^5$ at 90% hydrolysis requires greater than 120° C. for its dissolution. At the same molecular weight and at 99% hydrolysis its dissolution temperature is greater than 160° C. For both cases, a pressurized reactor is required. Precautions must be taken to prevent oxidative degradation of PVA at these temperatures. We now find that high molecular weight PVA having a high degree of hydrolysis from about 90% up to 99% can be modified with acrylamide in a simple one-step, low-temperature reaction (less than 100° C. such as 50° to 60° C.) to produce acrylamide modified PVA (AMPVA) which has a much higher viscosity than samples prepared via a two-step, high-temperature dissolution modification reaction) process.

According to the teaching of the aforementioned Lindemann, PVA will not be dissolved at 50°-100° C. under atmospheric pressures. Therefore, Lindemann's procedure is not applicable to the grade of specific PVA used in the instant invention. As previously mentioned, it is possible to prepare a dilute aqueous PVA solution (less than 5%) of such high molecular weight and degree of hydrolysis at greater than 160° C. in a pressurized vessel or an autoclave. This procedure is rather tedious and inefficient. Degradation of polymer can also occur under such severe conditions. Surprisingly, we have found that the PVA dissolution procedure in Lindemann could be eliminated by carrying out a heterogeneous reaction at low temperatures under atmosphere pressures. We have accordingly, prepared acrylamido-PVA ethers at temperatures lower than that of Lindemann's examples and having higher acrylamide content. Therefore, the process in accordance with this invention is an unexpected and surprising improvement over such prior art.

SUMMARY OF THE INVENTION

The concept of the present invention involves modifying PVA with acrylamide and other alpha, betaunsaturated carbonyl compounds by a low temperature (less than about 50° to 60° C.) reaction, producing high molecular weight modified PVA with minimal thermal degradation, and eliminating the need to dissolve PVA at high temperatures prior to its reaction with modifying compounds.

Accordingly, the invention is directed towards a one-step process for the preparation of high viscosity modified polyvinyl alcohols comprising forming a water slurry at room temperature of a PVA having a high degree of hydrolysis, a modifying agent and a base, heating said mixture to temperatures of less than 50° to 60° C. for a time sufficient to obtain the resultant modified high viscosity, high molecular weight product. The molecular weight of the product varies from at least about 1.0 to about $5.0 \times 10^5$ or more.

DESCRIPTION OF PREFERRED EMBODIMENTS

Modifying PVA with alpha, beta-unsaturated carbonyl compounds produces a class of very useful materials. They may be used for example as precursors in a number of chemical processes. The concept generally involves modifying high molecular weight PVA with acrylamide and other alpha, beta-unsaturated carbonyl compounds by low temperature ($<50°-60°$ C.) reaction, producing high molecular weight modified PVA with minimal thermal degradation, and eliminating the need to dissolve PVA at high temperatures prior to its reaction with modifying compounds, thereby reducing production costs.

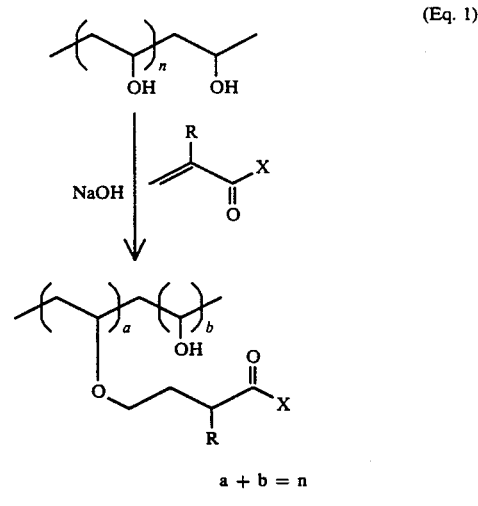

(Eq. 1)

$a + b = n$ $X = -NR_2, -NHR, H, -NH-\underset{\underset{CH_3}{|}}{\overset{\overset{CH_3}{|}}{C}}-CH_2SO_3^-Na^+$ (AMPS);

$-O^-$;

R and $R_2$ are independently selected from H, alkyl, aryl or alkylaryl with from about 12 carbons or less, preferably from about 8 to about 12. Acrylonitrile or substituted acrylonitrile such as methacrylonitrile may also be advantageously used.

Modified products are cold water soluble contrary to the high molecular weight parent PVA which has very low solubility in cold water, especially when the degree of hydrolysis is high (greater than 90% e.g., 90 to 95% or more). They are also more tolerant to brine (including NaCl, KCl solutions) than the unmodified PVA. Furthermore, these materials are thermally and hydrolytically stable in concentrated brines, which makes them potentially useful as oil field chemicals, adhesives, etc. In addition, the added functional groups can be used as synthetic handles for further reactions. Other modifying agents also can be used to modify the high molecular weight, highly hydrolyzed PVA; e.g., methacrylamide, 2-acrylamido-2-methyl-propane-3-(sulfonate) (AMPS), acrylonitrile and others described in Equation 1. It also should be noted that PVA having a lower molecular weight and a lower degree of hydrolysis can also be modified by this method. By high molecular weight PVA's is meant a molecular weight at least of $1.0 \times 10^5$ up to about $5.0 \times 10^5$ or more, highly suitable is a PVA of $3.5 \times 10^5$ molecular weight.

The general reaction conditions for these highly hydrolyzed PVA's (99%+) may include temperatures up to but not including 100° C. depending on the particular PVA. Preferred is a temperature of from about 80°-95° C. to as low as 50 to 60° C. with pressures varying from ambient, higher pressures may be used if desired but usually the pressure is autogeneous; reaction times vary from about 2 hours to 24 hours or more. The molar ratio of PVA to modifying agent varies from about 10:1 to about 1:10 and preferably from about 2:1 to about 1:3 depending upon the desired degree of modification. Higher reaction parameters, i.e., higher temperatures, longer reaction times, higher molar ratios, etc., will provide higher degrees of modification.

Any suitable basic substance which will not interfere with the modification reaction may be used. Preferred are such bases as NaOH.

The following examples are illustrative of the invention embodied herein.

EXAMPLE 1

A 5 gram sample of $3.5 \times 10^5$ molecular weight PVA, 99% hydrolyzed was dissolved in 95 grams of deaired distilled water in an autoclave under argon atmosphere at 160° C. for two hours. The resulting PVA solution was reacted with 20 grams of acrylamide and 1 gram of NaOH for 10 hours at about 85° C. The product was isolated by precipitating from i-propanol. Crude product was purified by redissolving in cold water and reprecipitating in i-propanol three times. Nitrogen analysis showed 2.99% N which is equivalent to 10.7% acrylamide incorporation. A 5% water solution of the copolymer had a viscosity of 70 cp.

EXAMPLE 2

Five grams of $3.5 \times 10^5$ molecular weight PVA, 99% hydrolyzed, 20 grams acrylamide and 1 gram NaOH formed a slurry in 95 grams of water at room temperature. This mixture was heated to 85° C. for ten hours. During the process of heating, PVA solid particles gradually disappeared. The product was collected and purified as in Example 1. Analysis showed 3.2% N or 11.5% acrylamide. A 5% solution has a viscosity of 294 cp.

EXAMPLE 3

Five grams of $3.5 \times 10^5$ molecular weight PVA, 99% hydrolyzed, 15 grams acrylamide and 1 gram NaOH formed a slurry in 90 grams of water at room temperature. After deairing, the mixture was heated to 60° C. and maintained at that temperature for 12 to 18 hours or until a homogeneous solution was formed. The product was isolated and purified by precipitating its aqueous solution with i-propanol four times. The dried product's acrylamide content is calculated from its nitrogen content which was obtained by elementary analysis. The product yield was 4.9 grams with 16% acrylamide.

EXAMPLE 4

Five grams of $3.5 \times 10^5$ molecular weight PVA, 99% hydrolyzed, 15 grams acrylamide and one gram NaOH formed a slurry in 90 grams of water at room temperature. After deairing, the mixture was heated to 70 C and maintained there for 12 to 18 hours or until a homogeneous solution was formed. The product was isolated and purified by precipitating its aqueous solution with i-propanol four times. The dried product's acrylamide content was then calculated from its nitrogen content which was obtained by elementary analysis. The product yield was 4.2 grams with 17.8% acrylamide.

The methods of Examples 2, 3, and 4 produce a more viscous product than does the method of Example 1. It is obvious that the lower temperature processes of the examples in accordance with the invention are an improvement over the prior art and are significantly more cost efficient.

AMPVA and AMPS PVA in particular are viewed as important profile control gel precursors. The ability to modify these highly hydrolyzed, high molecular weight PVA conveniently and economically enhances the attractiveness of these copolymers compared with other candidate systems, such as the AMPS-vinyl pyrrolidone-acrylamide copolymers.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A one-step process for the preparation of high viscosity modified polyvinyl alcohols comprising forming under atmospheric or autogeneous pressure, at room temperature with minimal thermal degradation a water slurry of
   (1) a normally water insoluble high molecular weigh polyvinyl alcohol having a high degree of hydrolysis,
   (2) a modifying agent, selected from alpha, beta-unsaturated carbonyl compounds, and
   (3) a base, heating said mixture to temperatures varying from about 50° to 100° C. for a time sufficient to obtain the resultant modified high viscosity, high molecular weight product wherein the molecular weight of said polyvinyl alcohol varies from at least about 1.0 to about $5.0 \times 10^5$ and, wherein the molar ratio of the polyvinyl alcohol to the modifying agent varies from about 10:1 to about 1:10.

2. The process of claim 1 wherein the base is NaOH.

3. The process of claim 1 wherein the modifying agent is selected from the group consisting of acrylamide, methacrylamide, acrylonitrile, methyacrylonitrile and sodium 2-acrylamido-2-methyl-propane-3-(sulfonate).

4. The process of claim 3 wherein the modifying agent is acrylamide.

5. The process of claim 3 wherein the modifying agent is methacrylonitrile.

6. The process of claim 3 wherein the modifying agent is 2-acrylamido-2-methyl-propane-3-(sulfonate).

7. The process of claim 6 wherein the polyvinyl alcohol has a molecular weight of at least about $3.5 \times 10^5$.

8. The process of claim 1 wherein the degree of polyvinyl alcohol hydrolysis varies from about 90 to about 95% or more.

9. The process of claim 8 wherein the degree of hydrolysis is about 99%.

10. The process of claim 1 wherein the temperature varies from ambient to about 90° C. or less.

11. The process of claim 10 wherein the temperature varies from about 60° to about 85° C.

12. The process of claim 11 wherein the temperature varies from about 60° to 70° C.

13. The process of claim 12 wherein the temperature varies from about 50° to 60° C.

* * * * *

UNITED STATES PATENT AND TRADEMARK OFFICE
CERTIFICATE OF CORRECTION

PATENT NO. : 5,104,933
DATED : April 14, 1992
INVENTOR(S) : Paul Shu It is certified that error appears in the above-identified patent and that said Letters Patent is hereby corrected as shown below:

Column 4, lines 54-55, read "polyvinyl alcohol having a high degree of hydrolysis," should read --polyvinyl alcohol having a high degree of hydrolysis varying from about 90 to about 99% or more,--

Signed and Sealed this

Twenty-eighth Day of September, 1993

*Attest:*

BRUCE LEHMAN

*Attesting Officer*     *Commissioner of Patents and Trademarks*